(12) United States Patent
Vasichek et al.

(10) Patent No.: US 8,261,872 B2
(45) Date of Patent: Sep. 11, 2012

(54) WORK MACHINE HAVING MODULAR IGNITION SWITCH KEYPAD WITH LATCHING OUTPUT

(75) Inventors: Shawn R. Vasichek, Fargo, ND (US); Scott R. Rossow, Kindred, ND (US)

(73) Assignee: Clark Equipment Company, West Fargo, ND (US)

( * ) Notice: Subject to any disclaimer, the term of this patent is extended or adjusted under 35 U.S.C. 154(b) by 104 days.

(21) Appl. No.: 12/795,281

(22) Filed: Jun. 7, 2010

(65) Prior Publication Data

US 2010/0307855 A1    Dec. 9, 2010

Related U.S. Application Data

(60) Provisional application No. 61/185,131, filed on Jun. 8, 2009.

(51) Int. Cl.
*B60K 26/00* (2006.01)
(52) U.S. Cl. ............................................ 180/315
(58) Field of Classification Search .................. 180/315, 180/320, 323, 324
See application file for complete search history.

(56) References Cited

U.S. PATENT DOCUMENTS

| | | |
|---|---|---|
| 3,054,904 A | 9/1962 | Fuciarelli |
| 3,784,839 A | 1/1974 | Weber |
| 4,158,874 A | 6/1979 | Ellsberg |
| 4,232,289 A | 11/1980 | Daniel |
| 4,236,594 A | 12/1980 | Ramsperger |
| 4,674,454 A | 6/1987 | Phairr |
| 5,751,073 A | 5/1998 | Ross |
| 5,794,580 A | 8/1998 | Galletti |
| 5,874,785 A | 2/1999 | Liu |
| 6,030,169 A | 2/2000 | Rossow et al. |
| 6,236,120 B1 | 5/2001 | Loraas et al. |
| 6,396,388 B1 | 5/2002 | Dong |
| 6,493,616 B1 | 12/2002 | Rossow et al. |
| 6,832,151 B2 | 12/2004 | Kumazaki et al. |
| 6,918,368 B2 | 7/2005 | Nantz et al. |

(Continued)

FOREIGN PATENT DOCUMENTS

EP    0857629 A2    8/1998
(Continued)

OTHER PUBLICATIONS

Search Report and Written Opinion dated Oct. 8, 2010 for International application No. PCT/US2010/037687, filed Jun. 8, 2010.

*Primary Examiner* — Faye M. Fleming
(74) *Attorney, Agent, or Firm* — John D. Veldhuis-Kroeze; Westman, Champlin & Kelly, P.A.

(57) ABSTRACT

A work machine having an engine, a hydraulic system powered by the engine, a source of electrical power, and electrical systems which run on the electrical power includes an ignition system and a modular ignition switch keypad to control the ignition system. The modular ignition keypad is mounted to the work machine in the operator compartment and generates a latching output to control electrical power distribution to the electrical systems and to control ignition functions to turn on and turn off the engine. The modular ignition switch keypad includes a start user input, a run user input, a stop user input and latching logic circuitry providing the latching output.

13 Claims, 5 Drawing Sheets

U.S. PATENT DOCUMENTS

| | | |
|---|---|---|
| 6,923,285 B1 * | 8/2005 | Rossow et al. ................ 180/272 |
| 7,216,616 B2 | 5/2007 | Asada et al. |
| 2001/0007087 A1 | 7/2001 | Brandt et al. |
| 2004/0168663 A1 | 9/2004 | Matsuura et al. |
| 2005/0029871 A1 | 2/2005 | Mori et al. |
| 2006/0220458 A1 | 10/2006 | Feldman et al. |
| 2006/0220806 A1 | 10/2006 | Nguyen |

FOREIGN PATENT DOCUMENTS

| | | |
|---|---|---|
| WO | 2006099520 A2 | 9/2006 |

* cited by examiner

WORK MACHINE HAVING MODULAR IGNITION SWITCH KEYPAD WITH LATCHING OUTPUT

CROSS-REFERENCE TO RELATED APPLICATION

The present application is based on and claims the benefit of U.S. provisional patent application Ser. No. 61/185,131, filed Jun. 8, 2009, the content of which is hereby incorporated by reference in its entirety.

FIELD OF THE INVENTION

Embodiments of the invention generally relate to work machines, and more specifically, to ignition systems for use with work machines.

BACKGROUND OF THE INVENTION

Work machines include loaders such as skid steer loaders, excavators, tractors, utility vehicles, and other construction or work vehicles. Typically, an ignition system of a work machine utilizes an ignition switch which requires a key to actuate in order to start the engine of the work machine. However, in construction or other environments in which a work machine typically operates, keys can be lost or misplaced easily, causing costly delays.

SUMMARY OF THE INVENTION

A work machine having an engine, a hydraulic system powered by the engine, a source of electrical power, and electrical systems which run on the electrical power includes an ignition system and a modular ignition switch keypad to control the ignition system. The modular ignition keypad is mounted to the work machine in the operator compartment and generates a latching output to control electrical power distribution to the electrical systems and to control ignition functions to turn on and turn off the engine. The modular ignition switch keypad includes a start user input, a run user input, a stop user input and latching logic circuitry providing the latching output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processor" and "controller" may include or refer to hardware and/or software. Thus, the claims should not be limited to the specific examples or terminology or to any specific hardware or software implementation or combination of software or hardware.

Furthermore, although the illustrated embodiment contemplates application of the invention to a loader, the invention may be applied to other construction or work machines as well.

Figure 1:
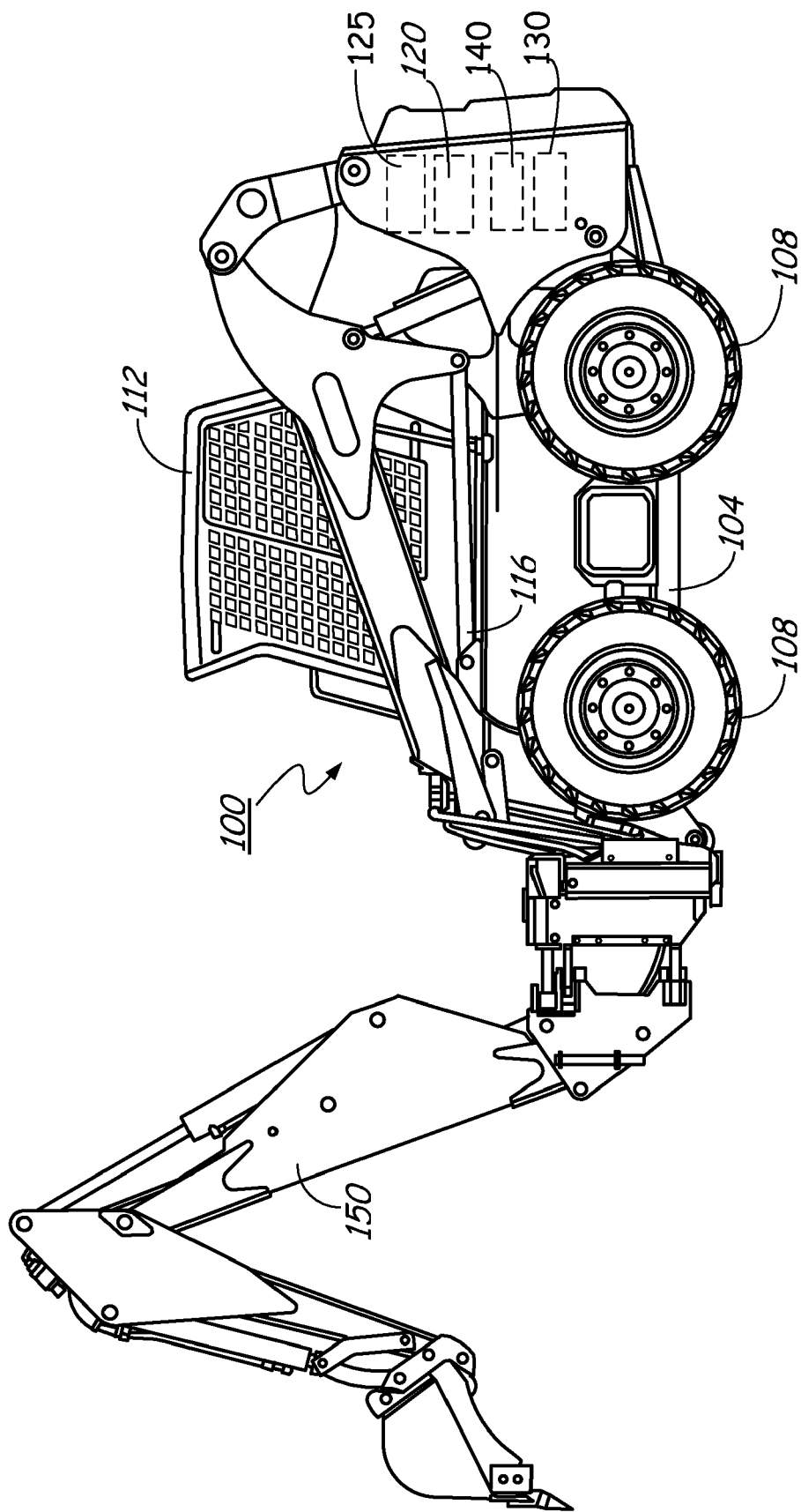
FIG. 1 is a side view of a work machine.

FIG. 1 is a side view of a work machine 100 such as a skid steer loader. While work machine 100 is illustrated as a skid steer loader, work machine 100 can also be other types of construction vehicles and work machines. For example, work machine 100 can be an excavator, other types of loaders, a tractor or other types of utility work machines. Shown in FIG. 1 is a hydraulically powered attachment 150 carried by the work machine and receiving hydraulic power from the work machine. While attachment 150 is illustrated in FIG. 1 to be a backhoe type attachment, attachment 150 can be any type of hydraulically powered attachment for a work machine. For example, attachment 150 can be other types of buckets, blades, backhoes, mowers, etc.

The work machine 100 includes a supporting frame or main frame 104 and wheels 108 to drive the power machine 100 with an internal combustion engine 120. Engine 120 drives one or more hydraulic pumps within a hydraulic system 125, and the pumps provide a flow of hydraulic fluid to actuators and hydraulic drive systems of the work machine. Also on work machine 100 are electrical systems 130 powered by a battery, by an electrical generating system (e.g., including an alternator), or both. Examples of electrical systems 130 include lighting systems and components, radio and/or communication systems and components, backlighting systems and components, operator interface systems and components, etc. As will be described and shown in greater detail, work machine 100 also includes an ignition system 140 which interfaces with a modular ignition switch keypad having a latching output to control electrical power distribution to electrical systems 130 and to control ignition of engine 120. Typically, the modular ignition switch keypad is positioned inside of an operator compartment 112, but this need not be the case in all embodiments.

The supporting frame 104 also includes the operator compartment 112 in which an operator operates the work machine 100. The operator compartment 112 typically includes a seat, a seat bar, and operating devices such as one or more hand grips or joysticks, instrument clusters, instrument displays, other display panels, other input panels, levers, foot pedals, and the like. For example, an operator can maneuver the joysticks in a certain way, which in turn, actuates one or more actuators 116, such as hydraulic cylinders. Although one actuator 116 is shown, it should be understood that the work machine 100 includes other actuators.

Figure 2:
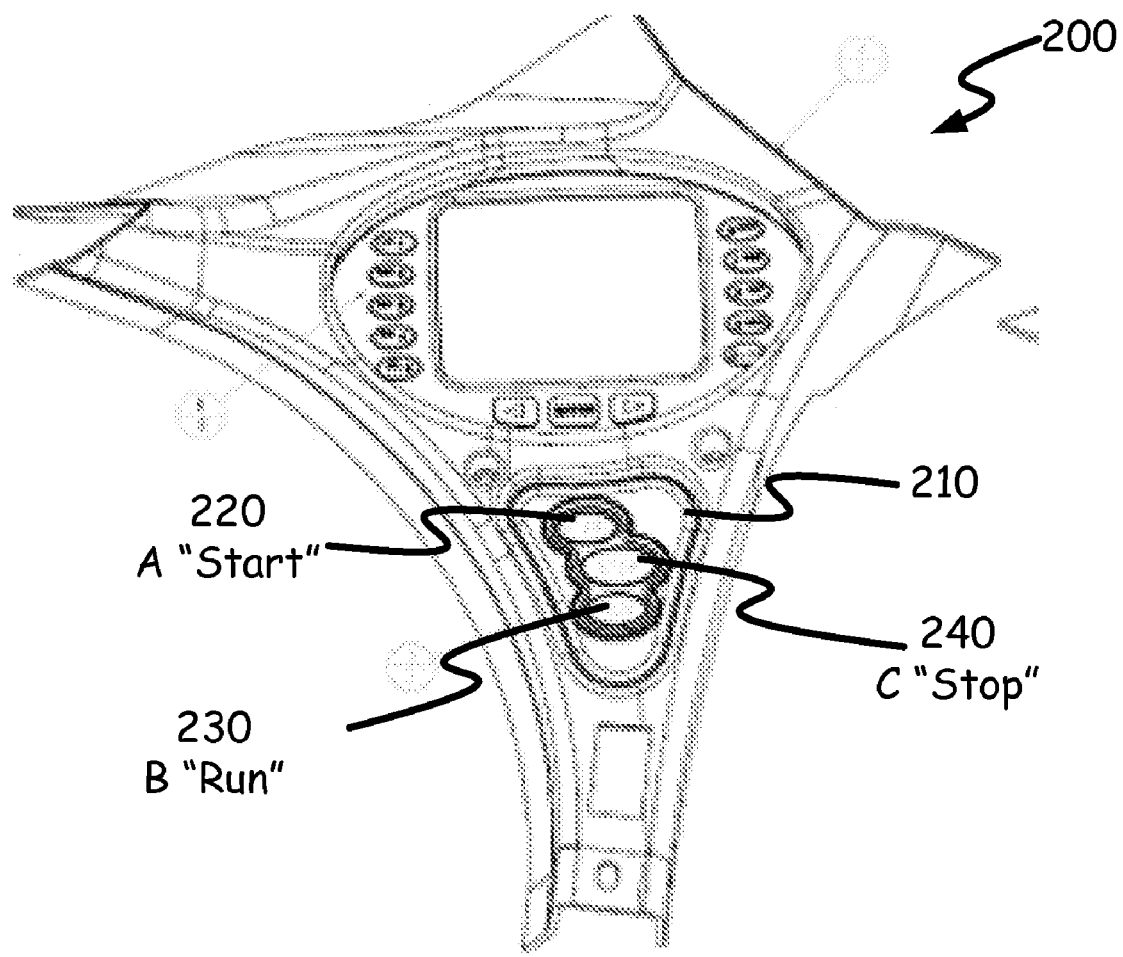
FIG. 2 is an illustration of a modular ignition switch keypad of the work machine of FIG. 1.

Referring now to FIG. 2, shown is a portion of a control panel 200, typically located within operator compartment 112. Control panel 200 includes a modular ignition switch keypad 210 for controlling the distribution of electrical power to electrical systems 130 and for controlling ignition functions to turn on and turn off engine 120. Keypad 210 can be considered to be part of, or to interface with, ignition system 140.

As shown in FIG. 2, keypad 210 includes a "Start" button, switch or actuatable input 220, a "Run" button, switch or actuatable input 230, and a "Stop" button, switch or actuatable input 240. Typically, inputs 220, 230 and 240 are momentary contact push button switches, but they can take other forms as well. Run switch 230 can be actuated to provide electrical power to electrical systems 130. Start switch 220 momentarily activates a starter motor only while held down to start the engine 120. Upon the engine starting, electrical power is also provided to electrical systems 130, regardless of whether "Run" switch 230 was first actuated. Pressing the stop button turns power off to the machine's engine and electrical systems.

Figure 3:
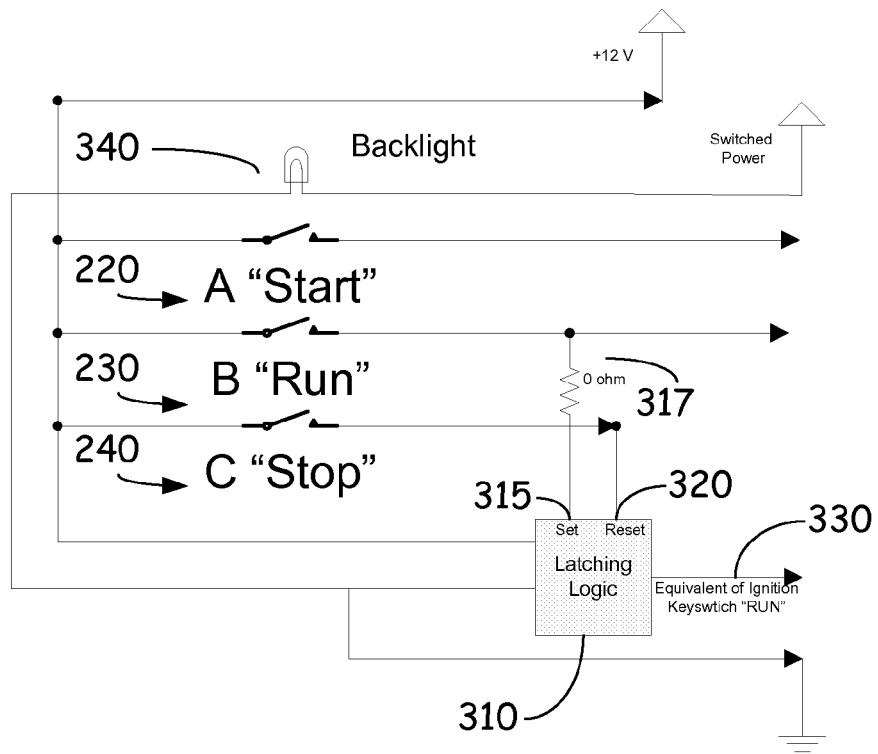
FIG. 3 is a first embodiment of a modular ignition switch keypad.

Referring now to FIG. 3, shown is a first embodiment 210-1 of an ignition switch keypad having a latching output. As can be seen in FIG. 3, keypad 210-1 includes switches 220, 230 and 240 having first nodes coupled to a power source, such as a +12V DC power source provided by a battery or by a power generation system. The second ends of each of the switches provide signals, when actuated, to latching logic component 310, to a controller and/or ignition components (shown in FIG. 5), or to both. A backlight 340 can also be included between a power source, such as a switched power source, and a ground connection in order to provide backlighting for display panels, operator controls, etc.

Latching logic 310 is coupled between the power source and ground, and includes a set input 315 and a reset input 320. Latching logic 310 provides an output 330 which functions in a manner similar to a conventional keyed ignition switch to control the provision of electrical power to electrical systems, and to turn off the engine and electrical systems of the work machine 100. As described above, when a user presses down on the "Start" switch, a starter motor is activated, typically via a controller. The starter motor is momentary and activates only while the "Start" button 220 is held down. The "Run" switch 230 is coupled to the set input 315 of latching logic component 310, via a removable resistor (e.g., 0 ohm resistor 317) which provides for different functional configurations of keypad 210-1, and latches the output 330 of latching logic 310. This functions similar to the releasing of a conventional ignition key where a mechanism holds the key in the run position. Pressing the "Stop" button is like turning the ignition key off in that it releases or toggles the latched run output 330 and turns the power off to the machine.

In one embodiment, using keypad 210-1, to provide and turn off electrical power to electrical systems, only switches 230 and 240 are used, respectively. In this embodiment, to turn the engine of the power machine on, the "Run" switch 230 must first be pressed to toggle output 330 to a keyswitch "RUN" or "TRUE" state, then the "Start" switch 220 is pressed to start the engine. Pressing the "Stop" switch 240 then turns the engine and electrical power off by toggling output 330 to an "OFF" or "FALSE" state. In these embodiments, output 330 of latching logic 310 acts to either enable, or provide an enablement or power signal to, a controller which controls the ignition components (e.g., starter motor) and electrical power distribution system. Without first pressing the "Run" switch 230 to toggle output 330 from its FALSE state, the "Start" switch 220 will not start the engine of the power machine.

In other embodiments, control circuitry (shown in FIG. 5) can be configured such that "Start" switch 220 can start the engine without first actuating "Run" switch 230. Typically, this would also require a means of toggling, or overriding, the latching logic output 330, so that it is in the correct state for enabling "Stop" switch 240 to turn these functions off.

Figure 4:
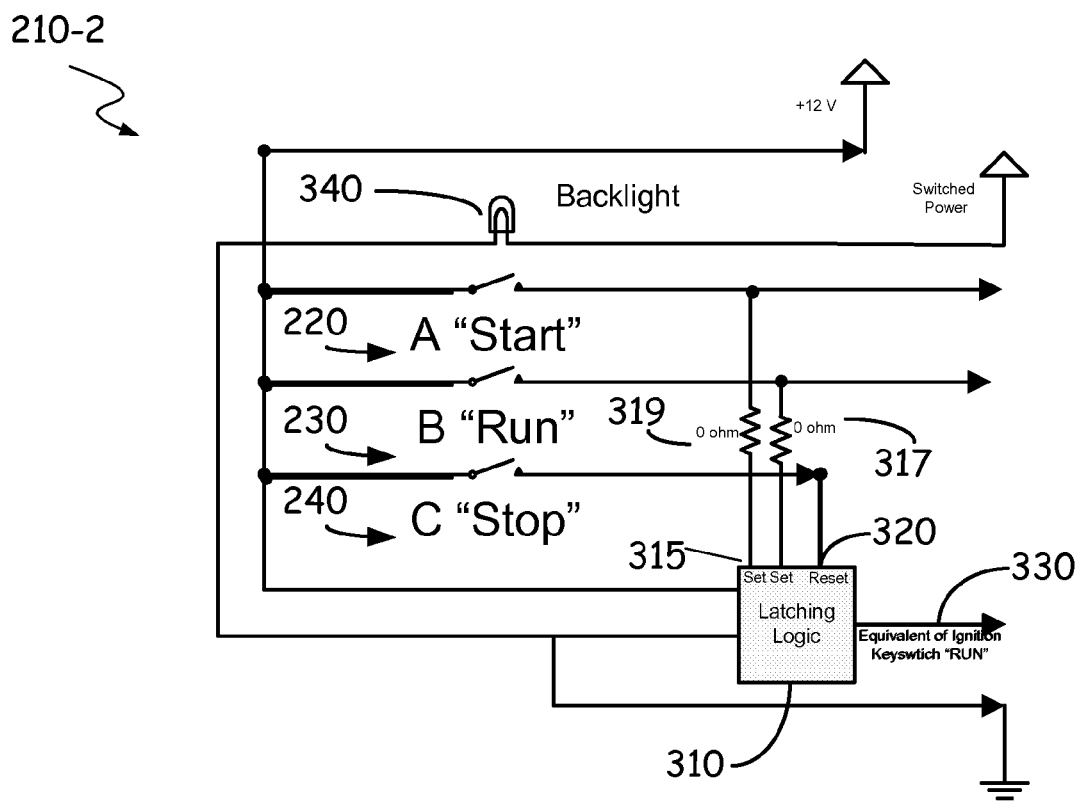
FIG. 4 is a second embodiment of a modular ignition switch keypad.

Referring now to FIG. 4, shown is a second embodiment 210-2 of an ignition switch keypad having a latching output. Ignition switch keypad 210-2 differs from keypad 210-1 in that "Start" switch 220 is also coupled to a set input 315. In one embodiment, this is also done through a removable resistor (0 ohm resistor 319) to allow for configurability of keypad 210-2 by removing the resistor to open circuit this connection. This allows different functionality to be provided for different machines or series of machines. Also, while two set inputs 315 are shown, in other embodiments one set input could be used, having both "Start" switch 220 and "Run" switch 230 coupled to the same set input of the latching logic. However, in some such embodiments, one or more isolation components can be used to isolate "Start" switch 220 from "Run" switch 230 such that "Run" switch 230 cannot cause the engine to start running. For example, a diode can be placed between "Start" switch 220 and the latching logic 330 in series with, or in place of, the 0 ohm resistor.

"Start" switch 220 provides a discrete output and latches the ignition RUN output of latching logic 330 to the ON or TRUE state. "Run" switch 230 provides a discrete output and also latches the ignition RUN output of latching logic 330 to the ON or TRUE state. "Stop" switch 240 provides a discrete output and also latches the ignition RUN output of latching logic 330 to an OFF or FALSE state. Thus, the latched output 330 is set by either "Start", "Run" or both depending on circuit population (0 ohm resistors). The latched output is reset only by the "Stop" switch. The configuration resistors (0 ohm resistors) are utilized to change the functionality of the buttons pressed and their effect on the latched output. In an example embodiment, the state can be maintained with an input voltage down to 3.0 volts in order to maintain operation during engine crank.

Figure 5:
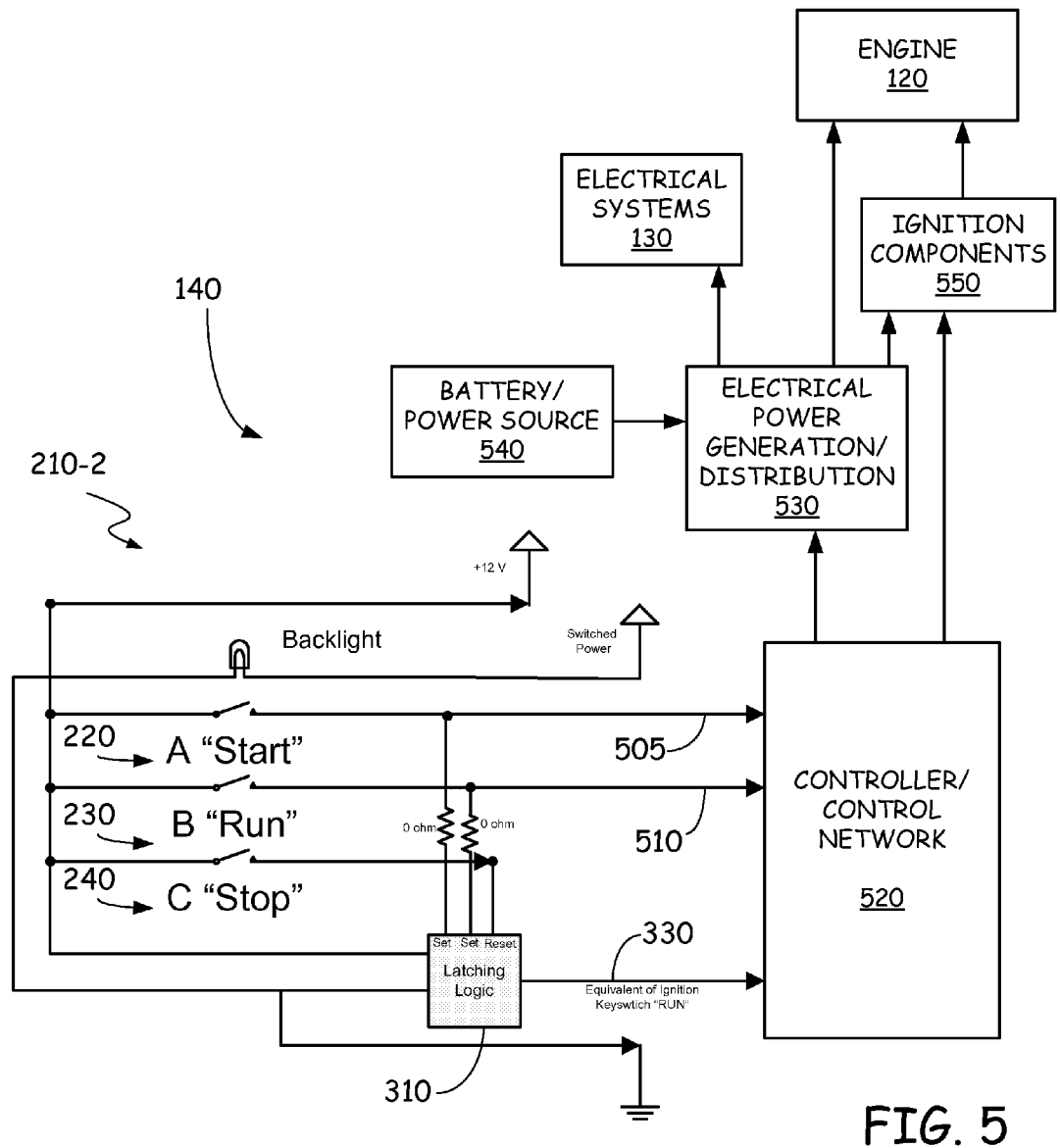
FIG. 5 is an illustration of a modular ignition switch keypad in conjunction with control components and other systems of the work machine.

Referring now to FIG. 5, shown is an example embodiment with keypad 210-2, showing further example circuitry and components. As shown in FIG. 5, "Start" switch 220 is coupled to a controller or a control network 520 via an electrical input 505. When actuated, switch 220 sets the latched output 330 to its TRUE state (assuming it was in the FALSE state), and provides a signal to controller 520. With latched output 330 in its TRUE state, controller 520 responds to the signal at input 505 by controlling the electrical power generation/distribution system 530 and the ignition components 550 (e.g., including starter motor) to start engine 120 with the help of batter/power source 540 and to provide electrical power to electrical systems 130. To turn engine 120 off and to turn off power to the electrical systems 130, "Stop" switch 240 is actuated and output 330 is toggled to its FALSE state.

When a user wishes to turn on the electrical systems 130 without starting engine 120, "Run" switch 230 can be actuated. This toggles output 330 to its TRUE state as described above. Controller 520 can use latched output 330 alone in determining whether to provide power to electrical systems 130 (e.g., by controlling electrical power generation/distribution system 530 and providing power from battery 540), or a second (optional) signal can be provided from switch 230 to the controller 520 via (optional) input 510, and controller 520 can control power to the electrical systems based on this second input 510 or based on a combination of input 510 and latched output 330 being in the TRUE state.

Although the present invention has been described with reference to preferred embodiments, workers skilled in the art will recognize that changes may be made in form and detail without departing from the spirit and scope of the invention.

What is claimed is:

1. A work machine having a frame, an engine supported by the frame, a hydraulic system powered by the engine, a source of electrical power, and electrical systems which run on the electrical power, the work machine further comprising:
   an operator compartment supported on the frame;
   an ignition system coupled to and controlling ignition of the engine;
   a modular ignition switch keypad mounted to the work machine in the operator compartment and having a start user input, a run user input, a stop user input and latching logic circuitry providing a latching output, wherein the latching logic circuitry has a set input and a reset input and wherein the run user input is in communication with the set input and the stop user input is in communication with the reset input; and
   wherein the modular ignition switch keypad is configured such that actuation of the start user input causes the ignition system to start the engine, wherein the modular ignition switch keypad is configured such that actuation of the run user input provides a signal to the set input to causes the latching logic circuitry to toggle the latching output to a run state in which electrical power is provided to the electrical systems, and wherein the modular ignition switch keypad is configured such that actuation of the stop user input provides a signal to the reset input to cause the latching logic circuitry to toggle the latching output to an off state in which electrical power is not provided to the electrical systems and in which the engine is turned off if running.

2. The work machine of claim 1, wherein the modular ignition switch keypad is further configured such that actuation of the start user input also causes the latching logic circuitry to toggle the latching output to the run state in which electrical power is provided to the electrical systems.

3. The work machine of claim 1, wherein the start user input is also coupled to the set input to toggle the latching output to the run state when the start user input is actuated.

4. The work machine of claim 1, wherein the modular ignition switch keypad is further configured such that actuation of the start user input only causes the ignition system to start the engine if the run user input has been actuated such that the latching output is in the run state when the start user input is actuated.

5. The work machine of claim 1, and further comprising a controller coupled between the modular ignition switch keypad and the ignition system and engine to control the ignition system and engine in response to user input at the modular ignition switch keypad.

6. The work machine of claim 5, wherein the controller is further coupled to an electrical power distribution system to control distribution of the electrical power in response to user input at the modular ignition switch keypad.

7. A work machine having an engine, a hydraulic system powered by the engine, a source of electrical power, and electrical systems which run on the electrical power, the work machine further comprising:
   an ignition system coupled to and controlling ignition of the engine;
   a modular ignition switch keypad mounted to the work machine, the modular ignition switch keypad configured to control electrical power distribution to the electrical systems and to control ignition functions to turn on and turn off the engine, the modular ignition switch keypad comprising a start user input, a run user input, a stop user input and latching logic circuitry providing a latching output, the latching logic circuitry having a set input and a reset input;
   wherein the modular ignition switch keypad is configured such that actuation of the start user input causes the ignition system to start the engine, wherein the modular ignition switch keypad is configured such that actuation of the run user input causes the latching logic circuitry to toggle the latching output to a run state in which electrical power is provided to the electrical systems, and wherein the modular ignition switch keypad is configured such that actuation of the stop user input causes the latching logic circuitry to toggle the latching output to an off state in which electrical power is not provided to the electrical systems and in which the engine is turned off if running.

8. The work machine of claim 7, wherein the modular ignition switch keypad is further configured such that actuation of the start user input also causes the latching logic circuitry to toggle the latching output to the run state in which electrical power is provided to the electrical systems.

9. The work machine of claim 7, wherein the run user input is coupled to the set input of the latching circuitry to toggle the latching output to the run state when the run user input is actuated, and wherein the stop user input is coupled to the reset input of the latching circuitry to toggle the latching output to the off state when the stop user input is actuated.

10. The work machine of claim 9, wherein the start user input is also coupled to the set input to toggle the latching output to the run state when the start user input is actuated.

11. The work machine of claim 7, wherein the modular ignition switch keypad is further configured such that actuation of the start user input only causes the ignition system to start the engine if the run user input has been actuated such that the latching output is in the run state when the start user input is actuated.

12. The work machine of claim 7, and further comprising a controller coupled between the modular ignition switch keypad and the ignition system and engine to control the ignition system and engine in response to user input at the modular ignition switch keypad.

13. The work machine of claim 7, wherein the start user input, the run user input, and the stop user input are push button switches.

* * * * *

UNITED STATES PATENT AND TRADEMARK OFFICE
CERTIFICATE OF CORRECTION

PATENT NO. : 8,261,872 B2
APPLICATION NO. : 12/795281
DATED : September 11, 2012
INVENTOR(S) : Shawn R. Vasichek et al.

It is certified that error appears in the above-identified patent and that said Letters Patent is hereby corrected as shown below:

In the Claims

Column 5, Claim 1,

Line 39, delete "causes" and insert --cause--

Signed and Sealed this
Fifteenth Day of October, 2013

Teresa Stanek Rea
*Deputy Director of the United States Patent and Trademark Office*